(12) United States Patent
Lutzka et al.

(10) Patent No.: US 6,994,391 B2
(45) Date of Patent: Feb. 7, 2006

(54) FLOOR RELEASE MECHANISM FOR USE WITH A REAR ROW AND REMOVABLE VEHICLE SEAT

(75) Inventors: Tavis S. Lutzka, Clawson, MI (US); Stanley D. Pacolt, Wixom, MI (US)

(73) Assignee: Bae Industries, Inc., Centerville, MI (US)

( * ) Notice: Subject to any disclaimer, the term of this patent is extended or adjusted under 35 U.S.C. 154(b) by 0 days.

(21) Appl. No.: 10/844,994

(22) Filed: May 13, 2004

(65) Prior Publication Data

US 2005/0253407 A1   Nov. 17, 2005

(51) Int. Cl.
*B60N 2/02* (2006.01)

(52) U.S. Cl. ............................ 296/65.03; 248/503.1

(58) Field of Classification Search ............. 296/65.03; 248/503.1
See application file for complete search history.

(56) References Cited

U.S. PATENT DOCUMENTS

| | | | |
|---|---|---|---|
| 4,700,989 A | 10/1987 | Ercilla | 297/331 |
| 5,372,398 A | 12/1994 | Aneiros | 296/65.1 |
| 5,482,345 A | 1/1996 | Bolsworth | 276/65.1 |
| 5,997,069 A | 12/1999 | Coffey | 296/65.03 |
| 6,183,032 B1 | 2/2001 | Champ | 296/65.03 |
| 6,254,163 B1 | 7/2001 | Schofield | 296/65.13 |
| 6,345,867 B1 | 2/2002 | Hellrung | 297/336 |
| 6,375,245 B1 | 4/2002 | Seibold | 296/65.03 |
| 6,375,246 B1 | 4/2002 | Nicola | 296/65.03 |
| 6,431,631 B1 | 8/2002 | Hofmann | 296/65.03 |

*Primary Examiner*—Lori L. Coletta
(74) *Attorney, Agent, or Firm*—Gifford, Krass, Groh, Sprinkle, Anderson & Citkowski, P.C.

(57) ABSTRACT

A release mechanism for use with a latch associated with a vehicle seat pivotally secured to a vehicle floor. A three-dimensional housing encloses an actuator mounted in axially translatable fashion upon the vehicle floor. A coil spring secures at a first end to an interior location of the housing, a second end of the spring engages the actuator in a selected biasing direction. A lever pivotally secures to a bracket extending from an underside location of the vehicle seat, an extending end of the lever engaging the actuator through the housing, a torsion spring biasing the lever in a given pivoting direction relative to the mounting bracket. A cable extends between the lever and the vehicle latch and, upon the actuator translating in a selected direction, the lever is caused to pivot and the cable to translate in order to disengage the latch and to permit pivoting of the seat relative to the vehicle floor.

20 Claims, 4 Drawing Sheets

FLOOR RELEASE MECHANISM FOR USE WITH A REAR ROW AND REMOVABLE VEHICLE SEAT

BACKGROUND OF THE INVENTION

1. Field of the Invention

The present invention relates generally to vehicle mounted floor release mechanisms. More specifically, the present invention discloses a powered and floor mounted track mechanism, used in cooperation with a seat mounted and pivoting lever mechanism, the same being operably connected to a latch assembly to effectuate release and pivoting of a vehicle seat to a forward dump position.

2. Description of the Prior Art

The prior art is well documented with examples of seat latch release and disengagement mechanisms, such as are particularly useful with a vehicle rear row seat and in particular to assist in forward dumping and, optionally, removal of the seat from the vehicle floor plan. The advantage in each instance is to provide a seat assembly which can be quickly and effectively converted from an engaged to a forwardly pivoted and/or removed position.

U.S. Pat. No. 5,372,398, issued to Aneiros, teaches a removable vehicle seat incorporating a retracting latch/ engaging roller seat-to-floor lock. The vehicle seat includes a rigid underside support structure with downwardly extending hook members. In relevant part, wheels are mounted on the rigid support structure for movement between an operative position extending below the downwardly facing surface of the rigid support structure and to enable the rigid support structure to be rolled over the upwardly facing surface of the vehicle floor and an inoperative position disposed above the operative position thereof. The vehicle seat further includes a mechanism for moving the hook members into the operative position thereof and the wheels into the inoperative, and for moving the hook members into the inoperative position thereof and the wheels into the operative position thereof.

U.S. Pat. No. 6,254,163, issued to Schofield, teaches a seat track assembly for attachment to an aperture in a vehicle floor pan and includes a seat track having an opening therein. An attachment bolt extends through the floor pan aperture and the seat track opening. The bolt has a shaft and a head with the width narrower than the opening. A fixation spring is positioned around the shaft and abuts the head to secure the seat track to the floor pan.

U.S. Pat. No. 4,700,989, issued to Ercilla, teaches a movable seat, particularly a removable vehicle seat assembly comprising a structure having front legs and rear legs, each of the legs including a fork member and arranged to cooperate with a fixed attachment rod of a frame. A movable lock member is provided on each leg and is used to lock the leg on the corresponding attachment rod. A return biasing mechanism is provided for urging each of the lock members into its locked position, and manually operated means are provided for actuating each of the lock members into its unlocked position, against the return biasing means, in order to release the seat legs from the corresponding attachment rods.

Finally, U.S. Pat. No. 6,375,246, issued to Nicola, teaches a fold and tumble seat support assembly for removably securing a vehicle seat to a pair of front and rear strikers on the floor of a vehicle. The seat support assembly includes a riser having a pair of forward and rearward legs. A rear latch is pivotally connected to each of the rearward legs and operable by a first linkage mechanism to latch and unlatch with the rear strikers. A front latch is pivotally connected to each of the forward legs and operable by a front latch handle to latch and unlatch with the front strikers. A rear support leg supports the rearward legs of the riser above the vehicle floor. A foot bracket is pivotally connected to each of the forward legs for supporting the riser above the vehicle floor between both a generally horizontal use position and a forwardly pivoted tumbled position.

A second linkage mechanism is connected between the foot brackets and the rear support legs for automatically retracting the rear support legs against the riser in response to pivotal movement of the seat about the foot bracket from the use position to the tumbled position. A pair of front and rear wheels are connected to the foot brackets and rearward legs, respectively, for providing rolling support of the seat when removed from the vehicle in a roll-away position.

SUMMARY OF THE PRESENT INVENTION

The present invention discloses a powered and floor mounted track mechanism, used in cooperation with a seat mounted and pivoting lever mechanism, the same being operably connected to a latch assembly to effectuate release and pivoting of a vehicle seat to a forward dump position.

The release mechanism includes a three-dimensional housing enclosing an actuator and which is mounted in axially translatable fashion upon the vehicle floor. In particular, the housing includes top and bottom assembleable housings within which is contained the linearly traversable actuator.

A coil spring secures a first end to an interior location of the housing. A second end of the spring engages the actuator in a selected biasing direction towards the first spring end. A cable secures to an end of the actuator opposite the coil spring, the cable extending through an opening formed in an axial end of the housing and being linearly translated in a withdrawing direction to engage the actuator.

A lever is pivotally secured to a bracket extending from an underside location of the vehicle seat. An extending end of the lever engages the actuator through an elongated slot formed in a top surface of the housing. A torsion spring biases the lever in a given pivoting direction relative to the mounting bracket.

A further cable extends between the lever and the vehicle latch and, upon the actuator translating in a selected direction, the lever is caused to pivot and the cable to translate (typically under tension) and in order to disengage the latch and to permit pivoting of the seat relative to the vehicle floor. In this fashion, such as a rear row mounted seat is capable of being quickly and easily dumped forwardly and, optionally, removed from the vehicle interior.

BRIEF DESCRIPTION OF THE DRAWINGS

Reference will now be made to the appended drawings, when read in combination with the following detailed description, wherein like reference numerals refer to like parts throughout the several views, and in which.

DETAILED DESCRIPTION OF THE PREFERRED EMBODIMENTS

Figure 1:
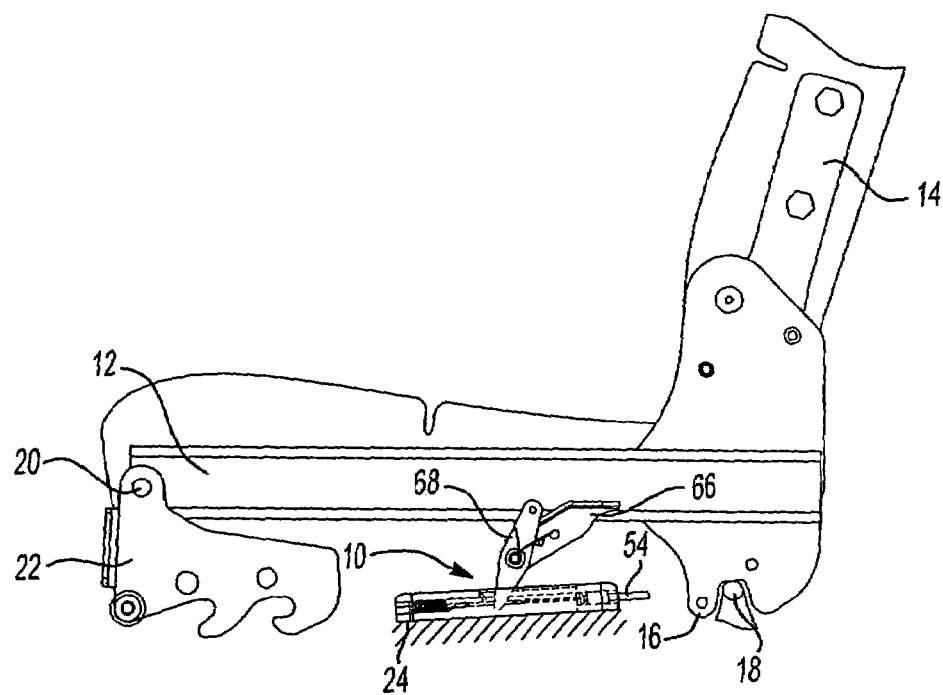
FIG. 1 is a plan view of the floor release mechanism in use with a vehicle seat and rearward latch and in a first engaged position.
Figure 2:
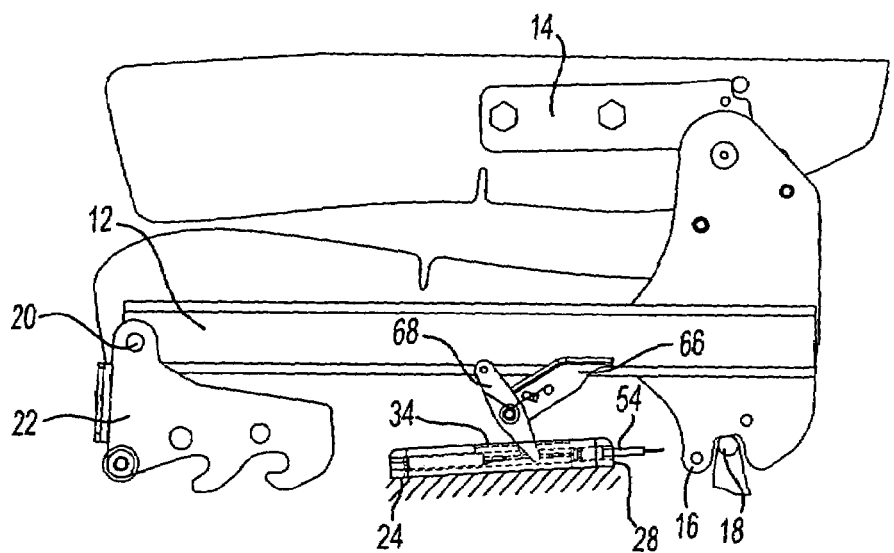
FIG. 2 is a succeeding plan view of the floor release mechanism and illustrating the pivoting lever in a disengaging position.
Figure 3:
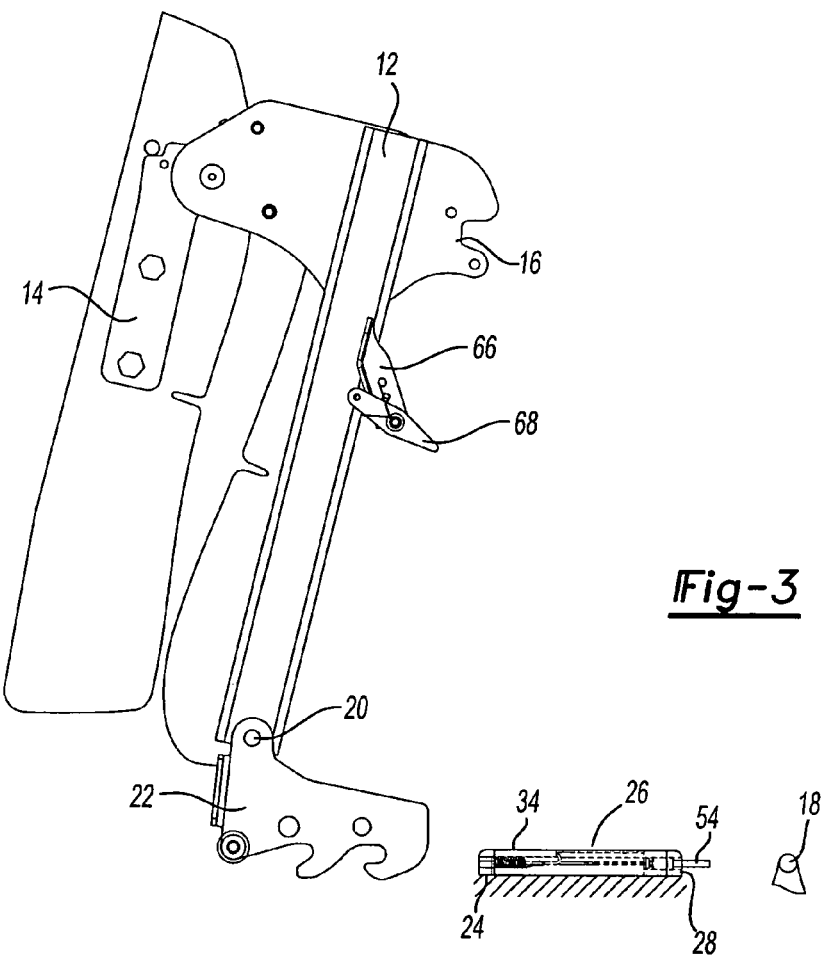
FIG. 3 is a further succeeding illustration of the rear row vehicle seat in a forwardly rotated and dump position.
Figure 4:
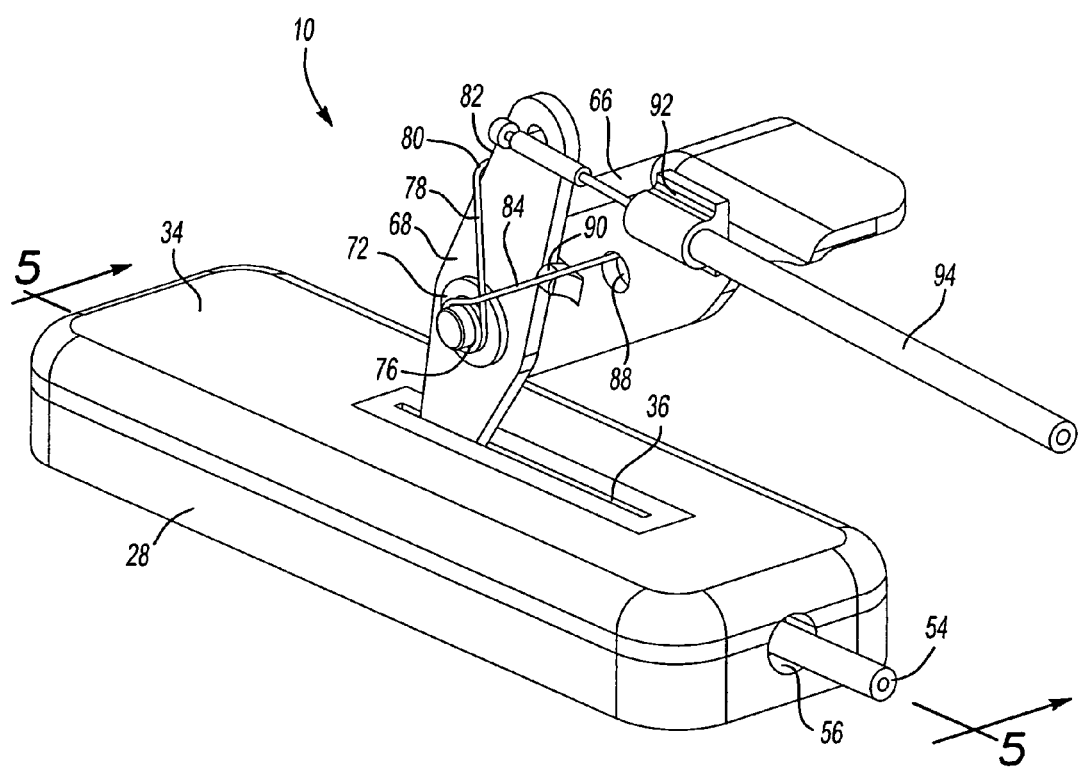
FIG. 4 is a sectional perspective illustration of the floor release mechanism according to the present invention and illustrating in particular the features of the power actuated cable, pivoting and spring loaded lever and interconnected/latch actuating cable.
Figure 6:
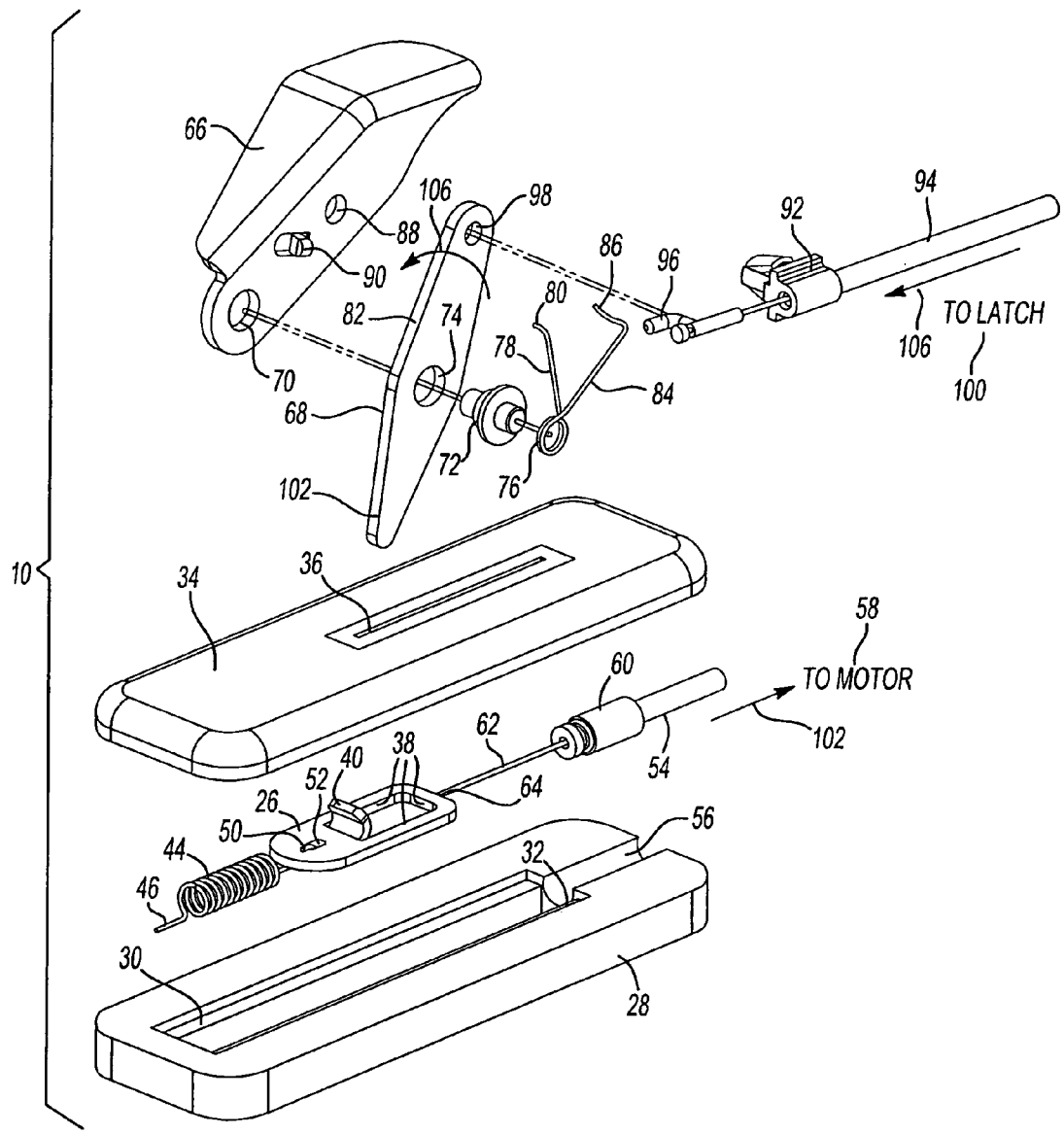
FIG. 6 is an exploded illustration of the floor release mechanism as substantially illustrated in FIG. 4 and according to the present invention.

Referring to FIGS. 1, 4 and 6, a floor release mechanism is illustrated at 10 in use with a vehicle seat, such including a seat frame bottom and pivotally interconnected seat back, see the latch, unlatch, and forward dump positions of each of FIGS. 1, 2 and 3 in succession. The seat bottom includes an underside and cushion-supporting frame 12, the seat back likewise including a pivotally connected frame portion 14, which supports an upper cushion.

As will be subsequently described, the floor release mechanism 10 of the present invention operates to interconnect a remotely positioned power source (such as an electrically powered motor mounted in a vehicle wheel well housing) with a rear latch 16 and striker plate 18 assembly (see again FIGS. 1–3) associated with the vehicle seat. Upon being unlatched (FIG. 2), the seat is permitted to pivot forwardly about a front pivot location 20 formed with a bracket 22 in turn supported at a forward location upon a vehicle floor 24, and such as prior to being removed from the vehicle.

Figure 5:
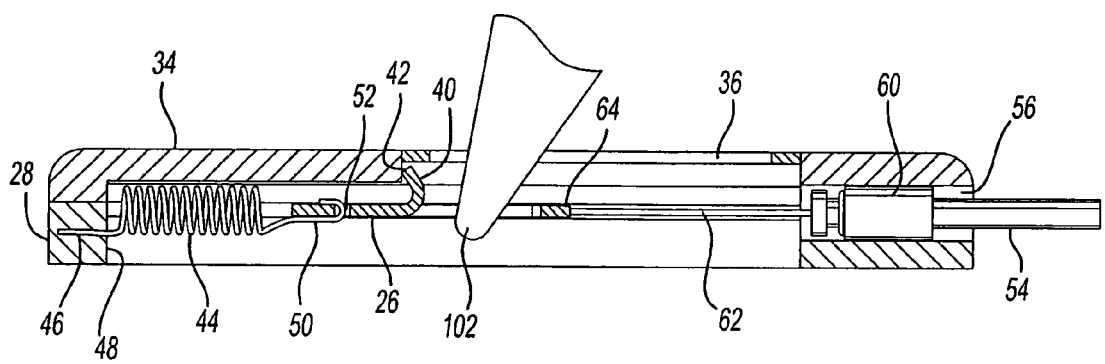
FIG. 5 is a cutaway illustration taken along line 5—5 of FIG. 4 and further illustrating the features of the actuator plate and spring, associated with the pivot lever, and operably connected to the power cable.

Referring also to FIGS. 4, 5 and 6, the floor release mechanism 10 includes a three-dimensional housing enclosing an actuator plate 26. The housing includes an open bottom housing 28 secured to the vehicle floor 24. A linear extending track extends along a predetermined length of the bottom housing 28 and is defined by spaced apart horizontal support surfaces 30 and 32 (see FIG. 6) for seating the actuator plate 26. A top housing 34 engages about an upwardly extending perimeter associated with the bottom housing and an elongated slot 36 is formed through a top surface of the housing 34.

As viewed in each of the environmental illustrations of FIGS. 1, 2 and 3, the housing (assembled components 28 and 34) is secured upon a location of the vehicle floor 24 intermediate the rear latch 16 and forward pivot location 20. Although not clearly illustrated, it is further understood that the axial centerline associated with the mechanism housing (see cutaway line 5—5 in FIG. 4) is positioned in a substantially parallel fashion relative to a line extending between the rear latch/striker plate arrangement 16/18 and the forward pivot location 20 associated with the support bracket 22.

The actuator plate 26 exhibits a substantially planar shaped body having an aperture (see interconnected side walls 38 in FIG. 6) formed therein. The actuator plate 26 exhibits an intermediate and curled portion 40 (FIGS. 5 and 6) abuts against an interior surface location 42 (FIG. 5) associated with the housing. A coil spring 44 secures at a first end 46 to an interior location 48 of the bottom housing portion 28, a second curled end 50 of the spring 44 engages through a further aperture 52 defined in the actuator plate 26, and in order to exert an axial biasing force on the actuator plate 26 in a direction toward the coil spring 44 and housing surface location 42.

A cable 54 secures to an end of the actuator plate 26 opposite the coil spring 44, such as in particular by extending through an opening 56 formed in an axial end of the assembled housing. A remote extending end of the cable 54 (see as is schematically illustrated at 58 in FIG. 6) is engaged by the remotely positioned electric motor (again not shown) and in order to be linearly translated in a withdrawing direction to engage and translate the actuator plate 26. Additional components associated with the cable 54 include a collar 60 sized to correspond closely in diameter with the sleeve shaped opening 56 defined in the housing end, as well as a stem portion 62 extending from an opposite end of the collar 60 and which engages at a remote end 64 to the actuator plate 26.

A mounting bracket 66 is secured to and extends from a location associated with the underside seat frame 12 associated with the vehicle seat. A lever 68 is pivotally and biasingly mounted through an aperture 70 formed in a vertically extending face of the bracket 66, such as by a coupling 72 inserting through an aperture 74 in the lever 68 aligning with the bracket aperture 70.

A torsion spring biases the lever 68 in a given pivoting direction relative to the mounting bracket 66. A central coiled portion 76 of the torsion spring is supported over the coupling 72, a first extending tang 78 including a curled end 80 which biases against an edge surface 82 of the lever 68. A second extending tang 84 likewise exhibiting a curled end 86 which seats within a secondary aperture 88 defined in the mounting bracket 66. An abutment stop 90 projecting from the vertical face of the bracket 66 prevents clockwise pivoting of the lever 68 beyond the position illustrated in FIG. 4. A sleeve 92 secures to a location upon the mounting bracket 66.

A further cable 94 is translatably supported through the sleeve 92 and secures, at one end 96, to a generally uppermost end location (see aperture 98) in the pivoting lever 68. As previously described, an opposite extending end of the cable 94 connects to the latch 16 and striker 18 arrangement generally referenced in FIGS. 1–3 and schematically at 100 in FIG. 6. It is further understood, with specific reference to the environmental views of FIGS. 1–3, that the cable 94 is not illustrated and for purposes of ease of illustration.

As best illustrated in reference to FIGS. 4 and 5, an inserting (toggle) end 102 of the pivoting lever 68 passes through the linear slot 36 defined in the top housing 34 and in order to seat against the inner facing surfaces 38 defining the aperture in the actuator plate 26. Upon the remotely positioned motor linearly actuating the cable 54 and actuator plate 26, see arrow 102 in the exploded view of FIG. 6, the actuator plate 26 is caused to translate in a corresponding direction, and against the biasing force of the coil spring 44. In response, the lever 68 is caused to pivot in a counter-clockwise fashion, see curved arrow 104 in FIG. 6, with attendant translation of the latch engaging cable 94 occurring along directional line 106 (also FIG. 6).

In this manner, the seat's latch assembly 16 is disengaged from the floor supported striker plate 18, upon the combined pivotal and translational motion described above and as referenced in FIGS. 1 and 2, viewed in succession. As referenced further again from FIG. 3, the seat is permitted to be dumped forwardly, such as after downward folding of the seat back 14 relative to the seat bottom 12, and can be removed from such as a rearward most row of a vehicle interior.

Having described our invention, other and additional preferred embodiments will become apparent to those skilled in the art to which it pertains, and without deviating from the scope of the appended claims.

We claim:

1. A release mechanism for use with a latch associated with a vehicle seat pivotally secured to a vehicle floor, said release mechanism comprising:
    an actuator mounted in axially translatable fashion upon the vehicle floor;
    a lever pivotally secured to an underside location of said vehicle seat, an extending end of said lever engaging said actuator; and
    a cable interconnecting said lever with the vehicle latch, said actuator translating in a selected direction, causing said lever to pivot and said cable to translate in order to disengage the latch and to permit pivoting of the seat relative to the vehicle floor.

2. The release mechanism as described in claim 1, further comprising a three-dimensional housing enclosing said actuator, an elongated slot formed through a top surface of said housing facilitating pivoting motion of said lever relative to said actuator.

3. The release mechanism as described in claim 2, said housing further comprising an open bottom housing secured to the vehicle floor, a linear extending track formed along a predetermined length of said bottom housing seating said actuator, a top housing engaging about an upwardly extending perimeter associated with said bottom housing.

4. The release mechanism as described in claim 3, further comprising a coil spring securing at a first end to an interior location of said housing, a second end of said spring engaging said actuator.

5. The release mechanism as described in claim 4, said actuator exhibiting a substantially planar shaped body exhibiting an aperture formed therein for receiving an inserting toggle end associated with said pivot lever.

6. The release mechanism as described in claim 4, said actuator exhibiting an intermediate and curled portion abutting against an interior surface location associated with said housing and in response to an axial biasing force exerted by said coil spring.

7. The release mechanism as described in claim 4, further comprising a second cable securing to an end of said actuator opposite said coil spring, said cable extending through an opening formed in an axial end of said housing and being linearly translated in a withdrawing direction to engage said actuator.

8. The release mechanism as described in claim 7, further comprising a remote extending end of said second cable being engaged by a motor.

9. The release mechanism as described in claim 1, further comprising a mounting bracket extending from an underside seat frame location associated with the vehicle seat, said lever being pivotally and biasingly mounted through an aperture formed in said bracket by a coupling.

10. The release mechanism as described in claim 9, further comprising a torsion spring biasing said lever in a given pivoting direction relative to said mounting bracket.

11. The release mechanism as described in claim 10, further comprising a sleeve secured to a location upon said mounting bracket, said sleeve guiding said cable secured to an upper end of said pivot lever.

12. The release mechanism as described in claim 1, said release mechanism exhibiting a specified shape and size, a striker plate being mounted to the vehicle floor and engageable with the latch upon downward pivoting of the seat.

13. A release mechanism for use with a latch associated with a vehicle seat pivotally secured to a vehicle floor, said release mechanism comprising:
    a three-dimensional housing enclosing an actuator and mounted in axially translatable fashion upon the vehicle floor, a coil spring securing at a first end to an interior location of said housing, a second end of said spring engaging said actuator in a selected biasing direction;
    a lever pivotally secured to a bracket extending from an underside location of said vehicle seat, an extending end of said lever engaging said actuator through said housing, a torsion spring biasing said lever in a given pivoting direction relative to said mounting bracket; and
    a cable extending between said lever and the vehicle latch;
    upon said actuator translating in a selected direction, said lever being caused to pivot and said cable to translate in order to disengage the latch and to permit pivoting of the seat relative to the vehicle floor.

14. The release mechanism as described in claim 13, said housing further comprising an open bottom housing secured to the vehicle floor, a linear extending track formed along a predetermined length of said bottom housing seating said actuator, a top housing engaging about an upwardly extending perimeter associated with said bottom housing.

15. The release mechanism as described in claim 13, said actuator exhibiting a substantially planar shaped body exhibiting an aperture formed therein for receiving an inserting toggle end associated with said pivot lever.

16. The release mechanism as described in claim 13, said actuator exhibiting an intermediate and curled portion abutting against an interior surface location associated with said housing and in response to an axial biasing force exerted by said coil spring.

17. The release mechanism as described in claim 13, further comprising a second cable securing to an end of said actuator opposite said coil spring, said cable extending through an opening formed in an axial end of said housing and being linearly translated in a withdrawing direction to engage said actuator.

18. The release mechanism as described in claim 17, further comprising a remote extending end of said second cable being engaged by a motor.

19. The release mechanism as described in claim 13, further comprising a sleeve secured to a location upon said mounting bracket, said sleeve guiding said cable secured to an upper end of said pivot lever.

20. A release mechanism for use with a latch associated with a vehicle seat pivotally secured to a vehicle floor, said release mechanism comprising:
    a three-dimensional housing enclosing an actuator and mounted in axially translatable fashion upon the vehicle floor, a coil spring securing at a first end to an interior location of said housing, a second end of said spring engaging said actuator in a selected biasing direction;
    a cable securing to an end of said actuator opposite said coil spring, said cable extending through an opening formed in an axial end of said housing and being linearly translated in a withdrawing direction to engage said actuator;
    a lever pivotally secured to a bracket extending from an underside location of said vehicle seat, an extending end of said lever engaging said actuator through an elongated slot formed in a top surface of said housing, a torsion spring biasing said lever in a given pivoting direction relative to said mounting bracket; and another cable extending between said lever and the vehicle latch;

upon said actuator translating in a selected direction, said lever being caused to pivot and said cable to translate in order to disengage the latch and to permit pivoting of the seat relative to the vehicle floor.

* * * * *